United States Patent [19]

Moosberg

[11] Patent Number: 5,655,723
[45] Date of Patent: Aug. 12, 1997

[54] FISHING REEL ADAPTED FOR SPOOLS OF DIFFERENT LENGTHS

[75] Inventor: Börje Moosberg, Mörrum, Sweden

[73] Assignee: Abu AB, Svängsta, Sweden

[21] Appl. No.: 429,766

[22] Filed: Apr. 27, 1995

[51] Int. Cl.$^6$ .................................................. A01K 89/015
[52] U.S. Cl. ...................... 242/322; 242/310; 242/596.7
[58] Field of Search ..................... 242/310, 317, 242/322, 312, 321, 578, 578.1, 578.2, 578.3, 596.7, 596.8

[56] References Cited

U.S. PATENT DOCUMENTS

| | | | |
|---|---|---|---|
| 1,358,049 | 11/1920 | Atwood | 242/321 X |
| 1,515,382 | 11/1924 | Cheesman | 242/578.1 |
| 4,121,783 | 10/1978 | Wolfinger et al. | 242/596.7 |
| 4,807,827 | 2/1989 | Welch | 242/279 |
| 5,356,086 | 10/1994 | Takagi | 242/596.7 |

FOREIGN PATENT DOCUMENTS

| | | | |
|---|---|---|---|
| 530559 | 2/1958 | Italy | 242/322 |
| 360052444 | 3/1985 | Japan | 242/578 |
| 192594 | 2/1923 | United Kingdom | 242/322 |

*Primary Examiner*—Daniel P. Stodola
*Assistant Examiner*—Emmanuel M. Marcelo
*Attorney, Agent, or Firm*—Browdy and Neimark

[57] ABSTRACT

A fishing reel of the multiplier type has a frame, a line spool having a center bore and rotatably mounted in the frame, and a shaft, on which the line spool is mounted. The line spool has, at least at one of its ends, a shaft member which is inserted a distance into the center bore of the line spool from a respective end thereof so as to protrude a predetermined distance therefrom.

9 Claims, 4 Drawing Sheets

FISHING REEL ADAPTED FOR SPOOLS OF DIFFERENT LENGTHS

BACKGROUND OF THE INVENTION

The present invention relates to a fishing reel of the multiplier type, and to a line spool intended for use in such a fishing reel.

Known fishing reels of this type generally have a frame with two inner side plates integrally formed therewith and two detachable, outer side plates. A shaft extends through the frame and is mounted in rotary bearings in the two outer side plates. A line spool is nonrotatably mounted on the shaft for rotation therewith. In an alternative embodiment, the shaft mounted in rotary bearings in the outer side plates has been replaced by a shaft supported therein by means of support bearings, and the line spool nonrotatably mounted on the shaft has been replaced by a line spool rotatably mounted on the shaft by means of rotary bearings (see e.g. U.S. Pat. No. 4,919,362). In these two variants, the shaft of the line spool bears at both ends on a resilient means which is arranged in the respective outer side plates and is part of a brake mechanism for adjustably braking the line spool. The shaft then has a length depending on the distance between the outer side plates and hence on the width of the fishing reel.

Today, frames for such prior-art fishing reels are often made of aluminum. In a known manufacturing process, the frame is die-cast in a mold. Since the manufacture of fishing reels of different width necessitates frames of different width, a separate mould is required for each desired frame width. In Applicant's copending U.S. patent application entitled "Method for making a frame for fishing reels of the multiplier type", filed on Mar. 31, 1995, is disclosed an alternative method for making aluminum frames for fishing reels of the multiplier type. In this method, a tubular aluminum section is produced by extrusion, a length corresponding to the width of the frame to be made is cut from the aluminum section, and this section length is processed to form a frame. As will be appreciated, the latter method does not require any new tools for changing the width of the frame to be adapted to the desired fishing-reel width. A new frame width is quite simply achieved by cutting from the extruded aluminum section a length corresponding to that width. Irrespective of which of the aforementioned methods is adopted for making a frame, the manufacture of fishing reels of different width necessitates line spools and shafts of different length. If the fishing-reel manufacturer keeps in stock a large number of fishing reels of different widths of a certain type, an equal number of line spools and shafts of different length must also be kept in stock.

SUMMARY OF THE INVENTION

One object of the present invention is to minimize the number of components to be kept in stock by providing a fishing reel and a line spool which are so designed that the same shaft construction can be used irrespective of the width of the fishing reel.

To this end, there is provided according to the invention a fishing reel of the multiplier type, comprising a frame, a line spool having a center bore and rotatably mounted in the frame, and a shaft on which the line spool is mounted, the line spool having, at least at one of its ends, a shaft member which is inserted a distance into the center bore of the line spool from a respective end thereof so as to protrude a predetermined distance therefrom.

To the same end, there is also provided according to the invention a line spool which is arranged on a shaft and intended to be rotatably mounted in a frame in a fishing reel of the multiplier type, and which has a center bore, the line spool having, at least at one of its ends, a shaft member which is inserted a distance into the center bore of the line spool from a respective end thereof so as to protrude a predetermined distance therefrom.

In a preferred embodiment, the shaft is divided and comprises two axially spaced-apart shaft members which are inserted in the center bore of the line spool from a respective end thereof so as to protrude a predetermined distance therefrom.

BRIEF DESCRIPTION OF THE DRAWINGS

The invention will now be described in more detail with reference to the accompanying drawings, in which.

DESCRIPTION OF THE PREFERRED EMBODIMENT

Figure 1:
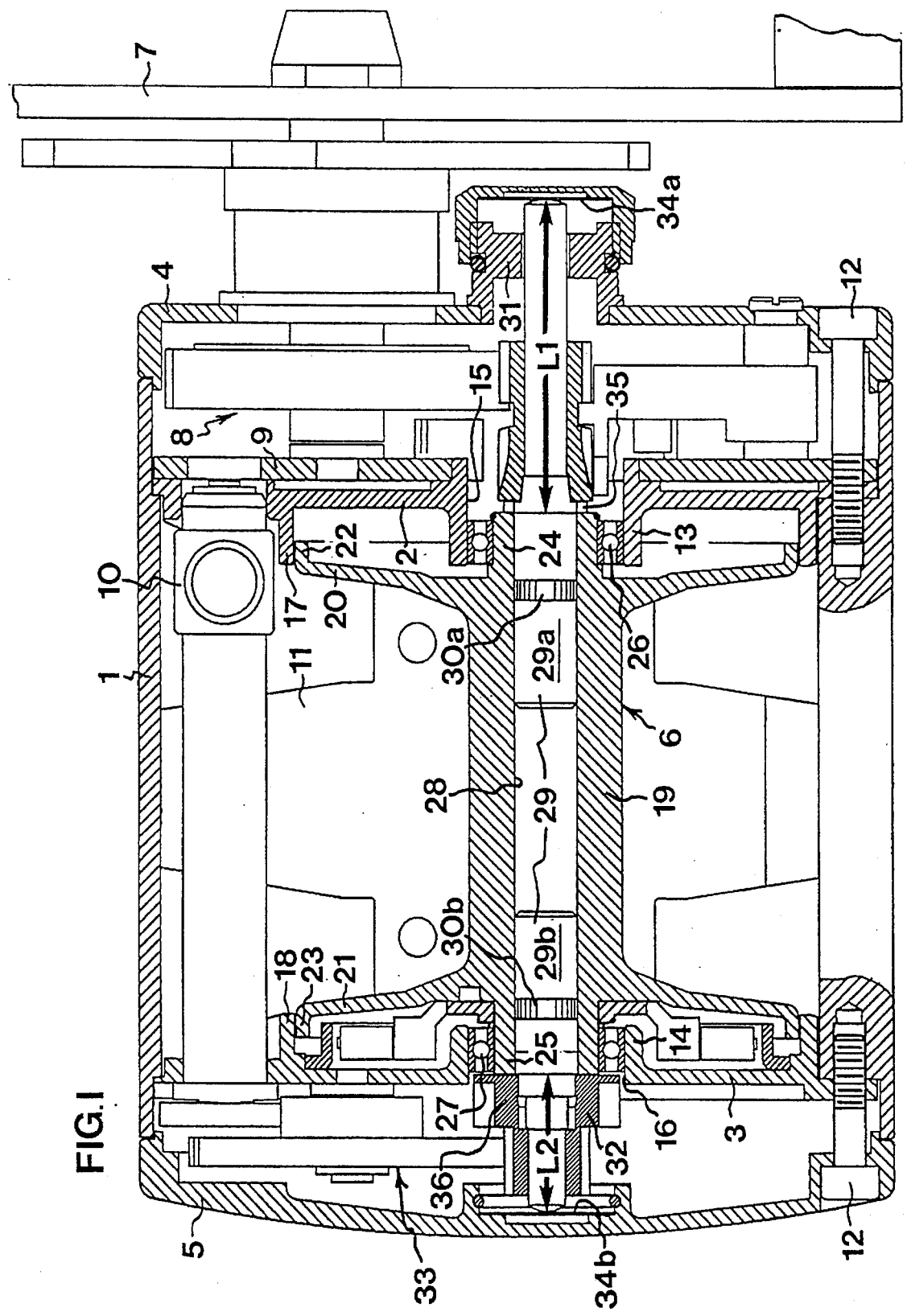
FIG. 1 illustrates a fishing reel according to the present invention in longitudinal section.

The fishing reel illustrated in FIG. 1 is of the multiplier type and has a substantially circular-cylindrical frame 1; which is of the type disclosed in Applicant's above-mentioned copending US patent application. Moreover, the fishing reel has two detachable, inner side plates 2 and 3, and two detachable, outer side plates 4 and 5. Also, the fishing reel has a line spool 6 for receiving a fishing line (not shown) and mounted in the frame 1 between the two inner side plates 2 and 3, a handle 7 with an associated transmission mechanism 8 for rotation of the line spool 6, a mounting plate 9 fixed to the right-hand inner side plate 2 and supporting the handle 7 and the transmission mechanism 8, a level-wind mechanism 10 mounted in the frame between the two inner side plates 2 and 3, and a foot 11 which is riveted to the frame 1 and by means of which the fishing reel can be mounted on a fishing rod (not shown).

The handle 7 with the associated transmission mechanism 8, the mounting plate 9 and the other components carried thereby, the level-wind mechanism 10, as well as the foot 11 lack importance for the inventive concept and, therefore, will not be described in more detail here.

The inner side plates 2 and 3, the outer side plates 4 and 5, and the mounting plate 9, all having circular shape, are fixed to the frame 1 by means of screws 12.

Each of the two inner side plates 2 and 3 has a centrally-positioned, axially-directed sleeve means 13 and 14, respectively, defining a central, circular through opening 15 and 16, respectively in each inner side plate. Each of the two inner side plates 2 and 3 further has a circumferential, axially inwardly directed flange 17 and 18, respectively, co-axial with the central opening 15 and 16, respectively.

The line spool 6 has a cylindrical body 19, which is provided at each end with a circumferential, substantially radial end flange 20, 21. The end flanges 20 and 21 each have an axially outwardly directed, circumferential flange 22 and 23, respectively, surrounded by the circumferential flange 17 and 18, respectively, of the inner side plates 2 and 3, respectively. At each end, the body 19 of the line spool 6 has an extension coaxial with the line spool and forming a sleeve means 24, 25 axially protruding from the line spool 6. The outer diameter of the sleeve means 24 and 25 is considerably smaller than the inner diameter of the sleeve means 13 and 14, respectively. The sleeve means 24 and 25 extend into the sleeve means 13 and 14, respectively, and are rotatably mounted therein by means of ball bearings 26 and 27, respectively. The line spool 6 has an axial center bore 28 extending through the spool body 19 and the two sleeve means 24 and 25.

As will be appreciated from the following, the center bore 28 need not necessarily be a through bore, but might consist of two coaxial bores extending a certain distance into the line spool 6 from both ends thereof.

The circumferential flanges 22 and 23 of the line spool 6 have an outer diameter which is but insignificantly smaller than the inner diameter of the circumferential flanges 17 and 18, respectively, of the inner side plates 2 and 3, respectively. Thus, a very small play exists between the circumferential flanges in the respective pairs of circumferential flanges 17 and 22, and 18 and 23. This small play is made possible by the line spool 6 being rotatably mounted directly in the two inner side plates 2 and 3, and by the mounting, as will be appreciated from the following, being independent of the manufacturing tolerances of the other components. The play is so small that not even today's thin fishing lines can penetrate in between the circumferential flange 22 of the line spool 6 and the circumferential flange 17 of the inner side plate 2, or between the circumferential flange 23 of the line spool 6 and the circumferential flange 18 of the inner side plate 3.

The shaft 29 of the line spool 6 consists of two shaft members 29a and 29b. The shaft members 29a and 29b each have a circumferential, knurled portion 30a and 30b, respectively, and are inserted with close fit in the center bore 28 of the line-spool 6. Thus, the line spool 6 is nonrotatably connected to the shaft 29. The right shaft member 29a is in a disengagable engagement (not described in more detail here) with the transmission mechanism 8 for rotating the line spool 6 when the handle 7 is turned for winding the fishing line on the line spool 6. The right shaft member 29a extends through the right-hand inner side plate 2 and the mounting plate 9 into the right-hand outer side plate 4, in which it is loosely mounted in a support bearing 31, the inner diameter of which is considerably larger than the diameter of the right shaft member 29a to make it possible to take up any shaft skewness in the support bearing 31. The left shaft member 29b extends through the left-hand inner side plate 3 and non-rotatably supports outside this side plate a gear unit 32 meshing with a transmission mechanism 33 for driving the level-wind mechanism 10. At their outer ends, the two shaft members 29a and 29b bear on a resilient friction element 34a and 34b, respectively, for adjustable braking of the shaft 29 and thus of the line spool 6.

The right shaft member 29a has a circumferential lug 35 formed integral therewith and engaging the right-hand end of the line spool 6, i.e. the free end of the sleeve means Hence, the right shaft member 29a protrudes a predetermined distance L1 from the right-hand end of the line spool 6, this distance being determined by the lug 35.

The gear unit 32 nonrotatably supported by the left shaft member 29b has a portion 36 which forms a lug corresponding to the lug 35 of the right shaft member 29a, and which engages the left-hand end of the line spool 6, i.e. the free end of the sleeve means 25. Hence, the left shaft member 29b protrudes a predetermined distance L2 from the left-hand end of the line spool 6, this distance being determined by the lug 36.

Figure 2:
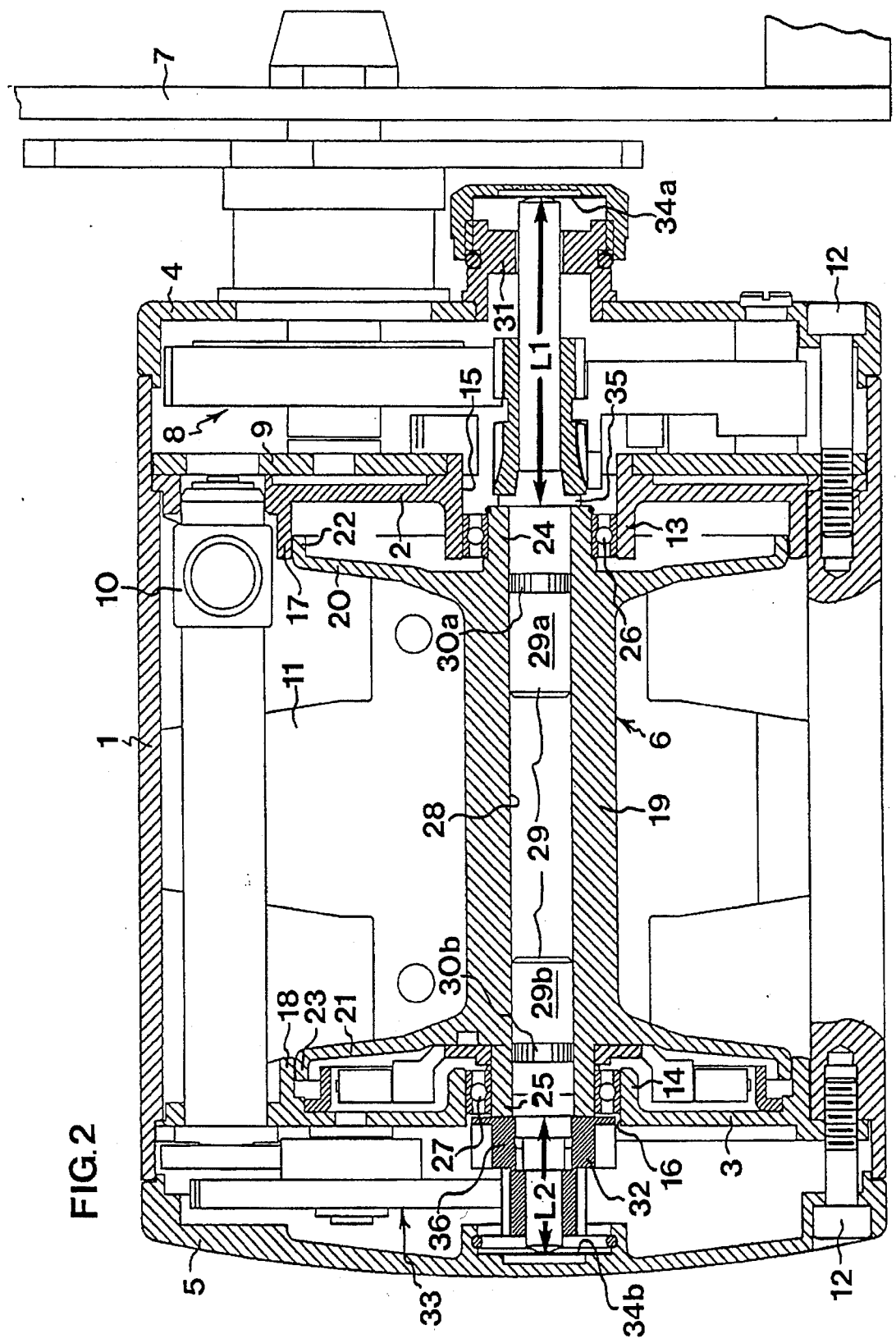
FIGS. 2 and 3 are similar to FIG. 1, but illustrate a fishing reel which is wider and narrower, respectively, than the fishing reel shown in FIG. 1.
Figure 3:
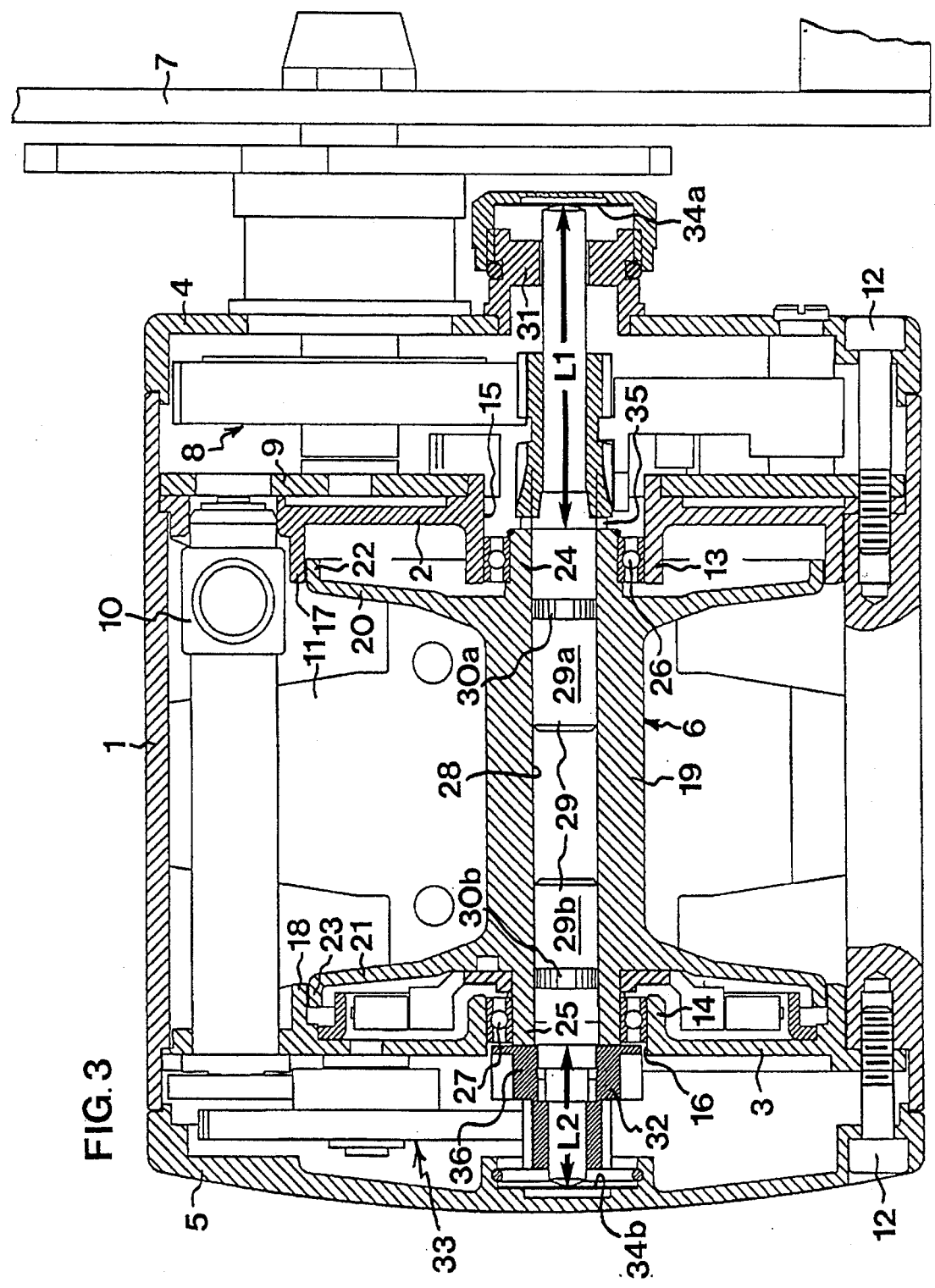

The fishing reels illustrated in FIGS. 2 and 3 differ from that shown in FIG. 1 in that one (FIG. 2) is wider and the other (FIG. 3) is narrower than the fishing reel in FIG. 1. This means that the frame 1, the line spool 6 and the level-wind mechanism 10 in FIGS. 2 and 3 are longer and shorter, respectively, than in FIG. 1. In other respects, the components of the fishing reels in FIGS. 2 and 3 are similar to those in the fishing reel in FIG. 1. Thus, use is made of identical shaft members 29a, 29b in all three fishing reels. This is made possible by the distance L1 and L2 being independent of the width of the fishing reel.

Figure 4:
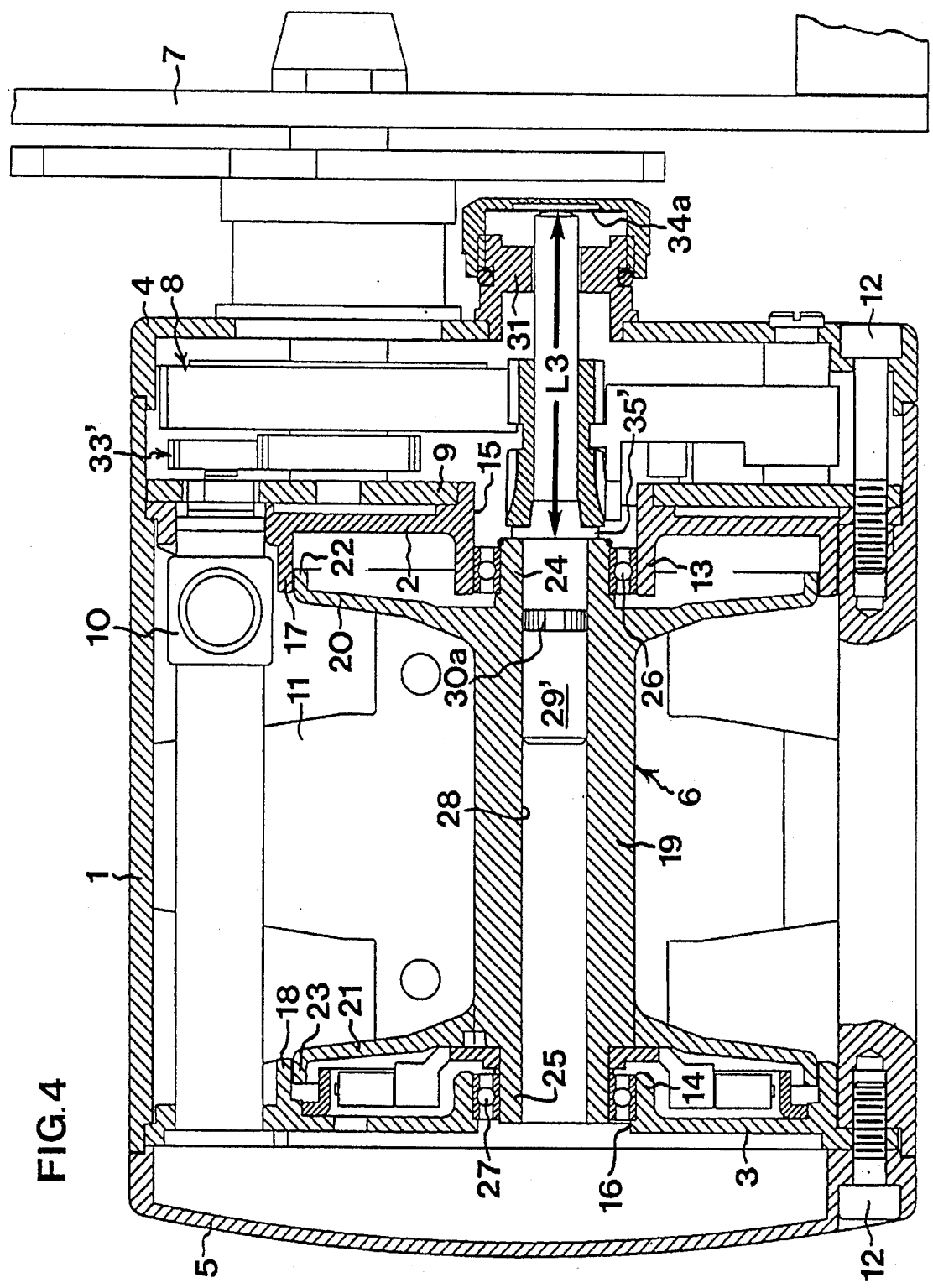
FIG. 4 shows an alternative embodiment of a fishing reel according to the present invention in longitudinal section.

The fishing reel shown in FIG. 4 differs from the fishing reels of FIGS. 1–3 in that the transmission mechanism 33 of the level-wind mechanism 10 (the transmission mechanism 33 being arranged in the left-hand outer side plate 5 in FIGS. 1–3) has been replaced by a transmission mechanism 33', which is arranged in the right-hand outer side plate 4 and operated by the handle 7 via the transmission mechanism 8. Here, the transmission mechanism 33' is thus not operated via the line-spool shaft, which means that the left shaft member can be dispensed with. In the fishing reel according to FIG. 4, the shaft thus consists only of one shaft member 29', corresponding to the right shaft member 29a in FIGS. 1–3 and having the same function and the same design as the latter. The shaft member or shaft 29' thus has a lug 35' formed integral therewith and engaging the right-hand end of the line spool 6, i.e. the free end of the sleeve means 24. Consequently, the shaft member 29' protrudes a predetermined distance L3 from the right-hand end of the line spool 6, this distance being determined by the lug 35'.

As will have been appreciated, it is now necessary, for the fishing reel in FIG. 4, to keep in stock shafts or shaft members 29' of one size only irrespective of the width of the fishing reel.

What I claim and desire to secure by Letters Patent is:

1. A fishing reel of the multiplier type, comprising:
   a frame;
   a transmission mechanism mounted to the frame;
   a line spool including an axial center bore and two line spool ends rotatably mounted in the frame;
   two shaft members inserted in the axial center bore at the line spool ends, the shaft members being axially spaced apart from one another;
   each of the two shaft members protruding a respective predetermined distance from a respective one of the line spool ends;
   wherein the shaft members are non-rotatable in relation to the line spool; and
   wherein at least one of the shaft members includes means for operatively connecting to the transmission mechanism to transmit torque therebetween.

2. The fishing reel as claimed in claim 1, wherein said shaft members each include thereon a lug engaging a corresponding one of the line-spool ends to define said predetermined protruding distance.

3. The fishing reel as claimed in claim 1, wherein both of said shaft members are inserted directly in the axial center bore of the line spool with close fit so as to be nonrotatably connected thereto.

4. A line spool rotatably mounted in a frame in a fishing reel of the multiplier type, the frame including a transmission mechanism mounted thereto; the line spool including:
   an axial center bore and two line spool ends;
   a shaft, on which the line spool is arranged, comprised of two shaft members inserted in the axial center bore at the line spool ends, the shaft members being axially spaced apart from one another;

each of the two shaft members protruding a respective predetermined distance from a respective one of the line spool ends; and the shaft members being non-rotatable in relation to the line spool;

wherein at least one of the shaft members includes means for operatively connecting to the transmission mechanism to transmit torque therebetween.

5. The line spool as claimed in claim 4, wherein said shaft members each include thereon a lug engaging a corresponding one of the line-spool ends to define said predetermined protruding distance.

6. The fishing reel as claimed in claim 4, wherein both of said shaft members are inserted directly in the axial center bore of the line spool with close fit so as to be nonrotatably connected thereto.

7. A set of fishing reels of the multiplier type, each of the fishing reels comprising:

a line spool having a line spool length along an axis and including an axial center bore and two fine spool ends;

a level wind mechanism having a level wind mechanism length in a direction parallel to the line spool length;

a frame having a constant cross-sectional shape perpendicular to the axis and a frame length in the direction parallel to the line spool length;

a transmission mechanism mounted to the frame;

a first shaft member and a second shaft member inserted in the axial center bore at a respective one of the line spool ends, and being axially spaced apart from one another;

the first shaft member and the second shaft member each protruding a respective predetermined distance from the respective one of the line spool ends;

wherein at least one of the first shaft member and the second shaft member includes means for operatively connecting to the transmission mechanism to transmit torque therebetween;

wherein each one Of the first shaft member and the second shaft member are respectively identical within the set; and wherein reels of the set vary from one another by a fixed length increments of the line spool length, the level wind mechanism length, and the frame length;

whereby reels of the set vary in length but other transverse dimensions and elements of the reels are identical within the set.

8. The set according to claim 7, wherein each respective predetermined distance is determined by a corresponding lug engaging the corresponding line spool end.

9. The set according to claim 7, wherein each of the shaft members is non-rotatably fitted into the axial bore.

* * * * *